US010926467B2

(12) United States Patent
Zhang et al.

(10) Patent No.: US 10,926,467 B2
(45) Date of Patent: Feb. 23, 2021

(54) 3D PRINTER WITH MULTIPLE LIGHT SOURCES AND ITS CONTROLLING METHOD

(71) Applicant: Zhejiang Xunshi Technology Co., Ltd, Shaoxing (CN)

(72) Inventors: Jing Zhang, Manhattan Beach, CA (US); Liang Jin, Shaoxing (CN); Haijun Pan, Shaoxing (CN); Lusheng Gao, Shaoxing (CN)

(73) Assignee: Zhejiang Xunshi Technology Co., Ltd, Zhejiang (CN)

( * ) Notice: Subject to any disclaimer, the term of this patent is extended or adjusted under 35 U.S.C. 154(b) by 17 days.

(21) Appl. No.: 16/384,911

(22) Filed: Apr. 15, 2019

(65) Prior Publication Data

US 2020/0324475 A1    Oct. 15, 2020

(51) Int. Cl.
*B29C 64/264* (2017.01)
*B29C 64/393* (2017.01)
*B33Y 50/02* (2015.01)
*B33Y 30/00* (2015.01)

(52) U.S. Cl.
CPC ......... *B29C 64/264* (2017.08); *B29C 64/393* (2017.08); *B33Y 30/00* (2014.12); *B33Y 50/02* (2014.12)

(58) Field of Classification Search
CPC ........ B29C 64/264; B33Y 30/00; B33Y 50/02
See application file for complete search history.

(56) References Cited

U.S. PATENT DOCUMENTS

| 2002/0171178 | A1* | 11/2002 | Dean | A61L 27/18 264/401 |
| 2014/0255666 | A1* | 9/2014 | Stucker | B29C 64/153 428/201 |
| 2018/0200948 | A1* | 7/2018 | Kuijpers | B29C 64/124 |
| 2018/0264736 | A1* | 9/2018 | Lefebvre | B33Y 50/00 |
| 2019/0022941 | A1* | 1/2019 | Wu | G02B 7/023 |
| 2019/0070777 | A1* | 3/2019 | Wu | B29C 64/135 |
| 2020/0031051 | A1* | 1/2020 | Wynne | B29C 64/277 |

* cited by examiner

*Primary Examiner* — Joseph S Del Sole
*Assistant Examiner* — Melody Tsui
(74) *Attorney, Agent, or Firm* — Xuan Zhang (57) ABSTRACT

A 3D printer includes a resin reservoir arranged for being filled with a predetermined amount of liquid resin, a light exposure module, and a control processor. The light exposure module includes a plurality of light sources supported above the resin reservoir, wherein each of the light sources is arranged for flashing a discrete image to solidify the liquid resin in the resin reservoir. The control processor controls the light sources to flash the discrete images at the same time and to combine the discrete images into a combined image for forming a layer of a 3D object when the liquid resin is solidified.

5 Claims, 7 Drawing Sheets

3D PRINTER WITH MULTIPLE LIGHT SOURCES AND ITS CONTROLLING METHOD

BACKGROUND

1. Field of the Invention

The present invention primarily relates to a 3D printer. More particularly, the DLP 3D printer incorporates with multiple light sources for creating a large printing area in a high speed and precision manner.

2. Discussion of the Related Art

A conventional DLP (Digital Light Processing) 3D printer comprises a digital projector supported above a platform, and a resin reservoir filled with resin. This technique is based on a digital model file, using a photosensitive resin material to construct a 3D object through layer-by-layer printing. Accordingly, the digital projector projects a single image to solidify the resin for creating one layer of the 3D object. As a result, DLP printing can achieve faster print times by solidifying the entire layer all at once. However, the conventional DLP 3D printer has several drawbacks.

The digital projector is a single light source to flash one single image. Each image is composed of a plurality of voxels which are small rectangular bricks. Therefore, the print area and the precision of printing are limited by the resolution of the single image and the numbers of voxels. In other words, the DLP 3D printer is restricted by voxel size. Smaller size of each voxel will increase the resolution of the image. However, the size of the image will be reduced. To increase the size of the image, the size of voxel will be enlarged. However, the resolution of the image will be decreased.

During the printing operation for larger print area, the digital projector is moved to project the subsequent image once the previous image is flashed. In other words, one layer of 3D object may be formed by different images. However, the operation time will be substantially prolonged by moving the digital projector and flashing different images to form one signal layer of the 3D object. Thus, the movement of the digital projector will create vibration to affect the precision of the printing.

The printing quality of the 3D object will be affected not only by the resolution of the image but also by the distortion of the voxel. In theory, each voxel is formed in a rectangular configuration to have two parallel edges. Through the digital projector, the voxel will distort to form an irregular quadrilateral, so as to reduce the printing accuracy.

Accordingly, it would be highly desirable to develop a DLP 3D printer incorporates with multiple light sources which can increase the printing speed and printing area of the 3D object in a precision manner.

BRIEF SUMMARY OF THE INVENTION

According to the present invention, a DLP 3D printer is described. The DLP 3D printer incorporates with multiple light sources for creating a large printing area in a high speed and precision manner.

According to the present invention, the 3D printer is a DLP printer comprising a resin reservoir arranged for being filled with a predetermined amount of liquid resin, a light exposure module, and a control processor. The light exposure module comprises a plurality of light sources supported above the resin reservoir, wherein each of the light sources is arranged for flashing a discrete image to solidify the liquid resin in the resin reservoir. The control processor controls the light sources to flash the discrete images at the same time and to combine the discrete images into a combined image for forming a layer of a 3D object when the liquid resin is solidified.

It is another object of the present invention to provide a DLP 3D printer, wherein the discrete images are combined edge-to-edge to enlarge the solidifying area of the liquid resin.

It is further another object of the present invention to provide a DLP 3D printer, which permits the user to quickly and easily built a bigger 3D object in timely and precise manner.

It is further another object of the present invention to provide a DLP 3D printer, wherein the voxels of each discrete image are corrected its distortion to enhance the printing quality of the 3D object.

It is yet another object of the present invention to provide a DLP 3D printer, wherein the light sources are immovable during the operation to minimize the vibration of each of the light sources.

It is yet another object of the present invention to provide a DLP 3D printer, wherein the scraper is moved to scrap and flatten the surface of the liquid resin to ensure the liquid resin being modified properly.

It is yet another object of the present invention to provide a DLP 3D printer, which is easy to use without assistance, and inexpensive to manufacture.

It is yet another object of the present invention to provide a DLP 3D printer, wherein the control method thereof is simply and effective to build a bigger 3D object while being time effective.

For a more complete understanding of the present invention with its objectives and distinctive features and advantages, reference is now made to the following specification and to the accompanying drawings.

BRIEF DESCRIPTION OF THE DRAWING(S)

These and other features, aspects and advantages of the present invention will become better understood from the following description, appended claims, and accompanying figures where:

DETAILED DESCRIPTION OF THE INVENTION

Figure 1:
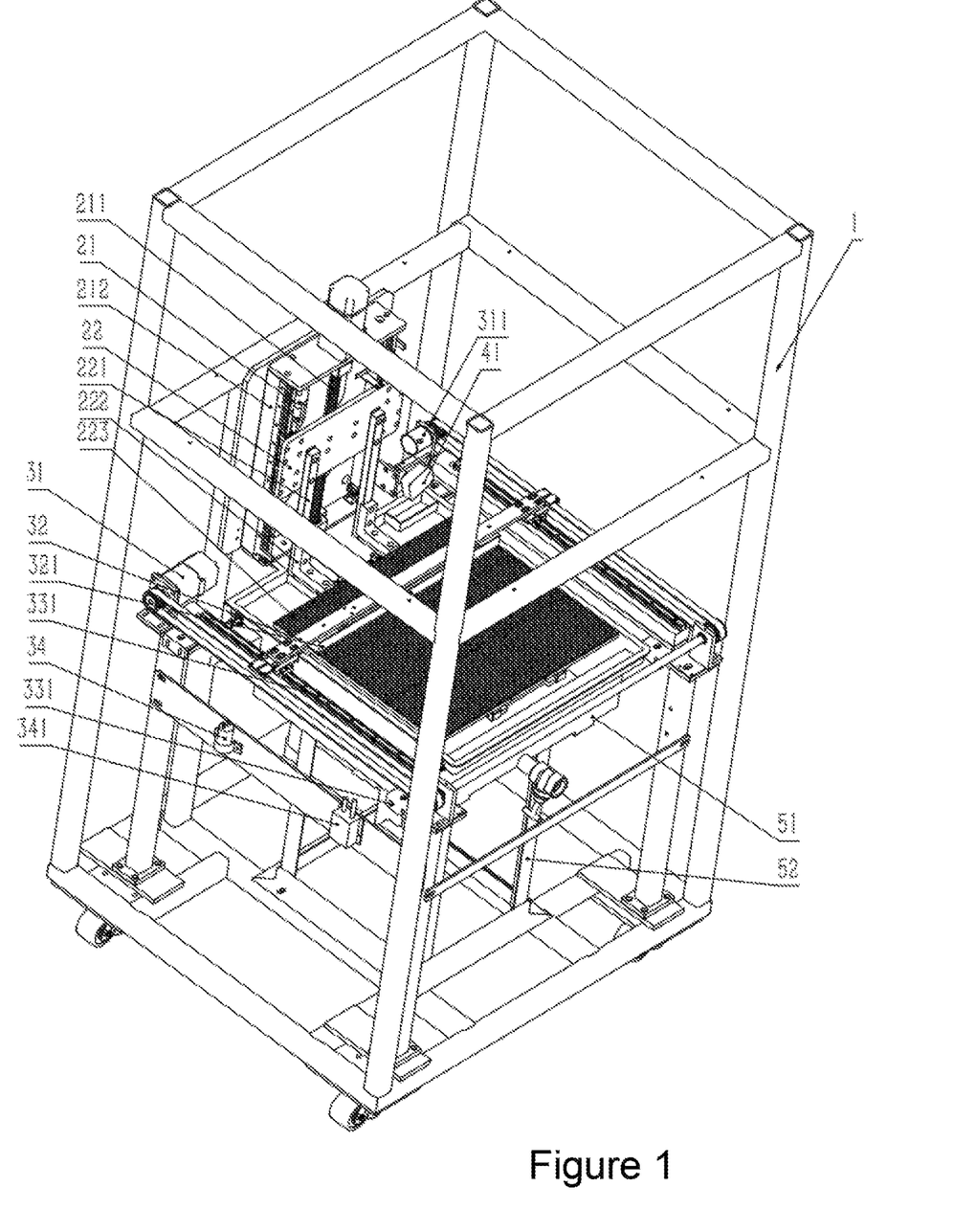
FIG. 1 is a perspective view of a 3D printer according to an embodiment of the present invention.
Figure 2:
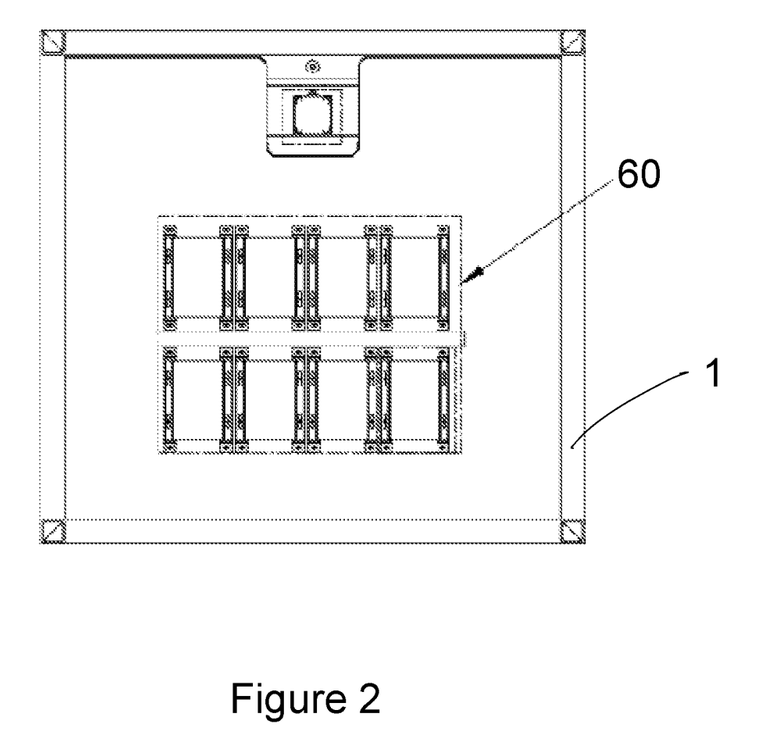
FIG. 2 shows a light exposure module the 3D printer according to the present invention.

For purposes of description herein the terms "upper," "lower," "right," "left," "rear," "front," "vertical," "horizontal" and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used in this disclosure, the term "comprise" and variations of the term, such as "comprising" and "comprises," are not intended to exclude other additives, components, integers or steps.

The present invention provides a 3D printer according to an embodiment is disclosed. It is preferred that the printer is a DLP printer for building a 3D object. The printer of the present invention comprises a frame 1, a light exposure module supported by the frame 1, a printing module, a scraping arrangement, a liquid surface control arrangement, and a control module.

FIG. 1 depicts the 3D printer, wherein the printing module comprises a resin reservoir 51 arranged for being filled with a predetermined amount of liquid resin, such as photosensitive resin. The light exposure module comprises a plurality of light sources 60 supported above the resin reservoir 51. The scraping arrangement is provided on the surface of the liquid resin and below the light exposure module. The liquid surface control arrangement is located above the resin reservoir 51, and the control module controls the printing operations of the printer.

Each of the light sources 60 is arranged for flashing a discrete image 100 to solidify the liquid resin in the resin reservoir 51. More specifically, each light source 60 generates ultraviolet light (UV) directly to the printing module in order to cure and solidify the liquid resin to form a layer of the 3D object. The curing time of each layer of the 3D object depends on the properties of the liquid resin. The projection time of each image from the light source 60 to form the layer of the 3D object is consistent.

The control processor 10 controls the light sources 60 to flash the discrete images 100 at the same time and to combine the discrete images 100 into a combined image for forming a layer of a 3D object when the liquid resin is solidified.

Figure 3:
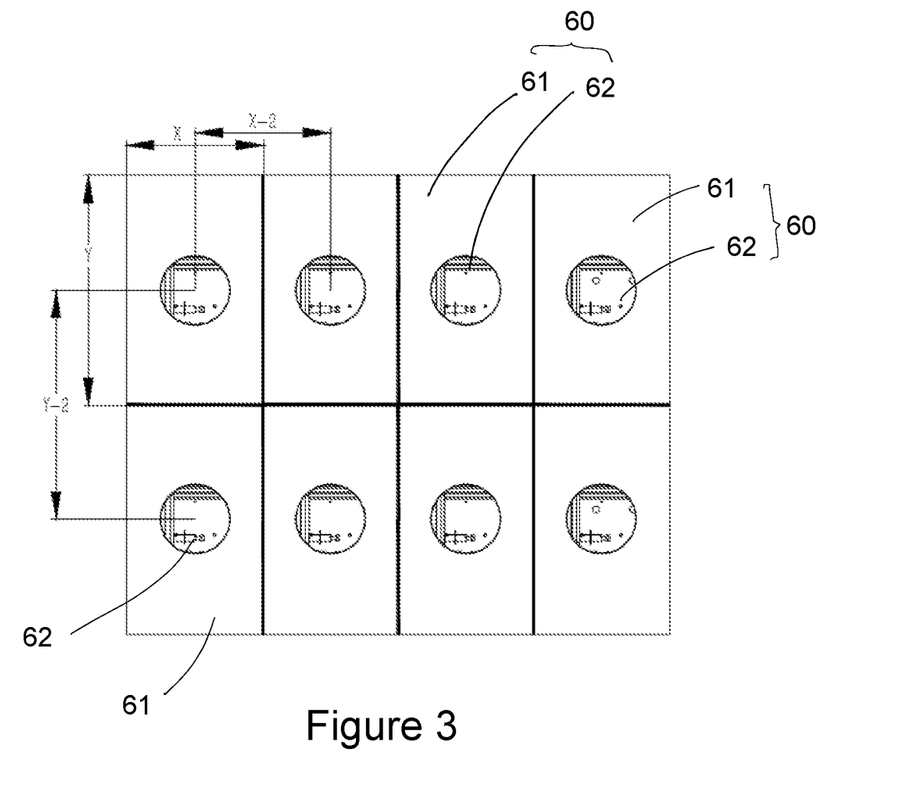
FIG. 3 shows an array of the light sources of the 3D printer according to the present invention.

FIGS. 1 to 3 depict the multiple light sources 60 to increase the printing area on the liquid resin, wherein the light sources 60 are aligned with each other and are positioned side-by-side. More specifically, each of the discrete images 100 defines a discrete resin solidifying area on the resin reservoir 51 and the combined image defines a combined resin solidifying area, i.e. the printing area, on the resin reservoir 51 which is larger than each of the discrete resin solidifying area. It is worth mentioning that the sum of the discrete resin solidifying areas is smaller than the combined resin solidifying area. The combined resin solidifying area is not smaller than an area of the layer of the 3D object. The combined resin solidifying area on the resin reservoir 51 is defined on the resin reservoir 51 as an area of the liquid resin being solidified to form the layer of the 3D object.

The number of light sources 60 can be selectively varied depending on the printing area on the liquid resin within the resin reservoir 51. The number of light sources 60 can be 4, 8, 9, 12 . . . , and the arrangement of the light sources 60 can be 2×2, 4×2, 3×3, 4×3 . . . . The light sources 60 can be grouped in one set, and multiple sets of light source 60 can be controlled by the control processor 10. More specifically, the light sources 60 are supported above the resin reservoir 51 in an immovable manner during the printing operation. Since the printing area is enlarged via the combined image, the light sources 60 are required for moving to cover the printing area. Therefore, the light sources 60 will not be moved to cause any vibration during the printing operation.

Figure 4:
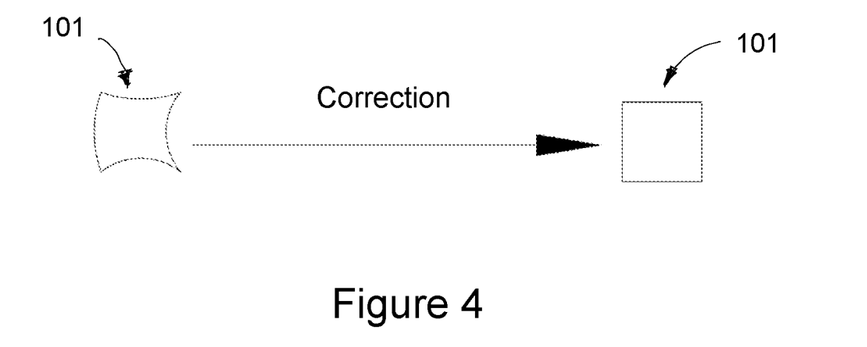
FIG. 4 shows the distortion correction of the voxel according to the present invention.

According to the present invention, the light sources 60 are supported at a same horizontal plane and are supported side-by-side with a predetermined interval that edge portions of two neighboring of the discrete images 100 are overlapped with each other in order to combine the discrete images 100 to form the combined image. It is noted that each of the discrete images 100 is composed on a plurality of voxels 101, wherein the resolution of the discrete image 100 is defined by the number of voxels 101 in a predetermined area. The control processor 10 further corrects distortion of each of the voxels 101 to ensure each of the voxels 101 formed in a rectangular shape as shown in FIG. 4. Before the correction, the voxel 101 is formed in an irregular quadrilateral, which will affect the printing accuracy and the surface quality of the 3D object. The control processor 10 will correct the distortion of each voxel 101 to enhance the printing accuracy and the surface quality of the 3D object and to ensure the discrete images 100 being combined to form the combined image. The discrete images 100 with the rectangular voxels 101 can be easily combined together.

In FIG. 3, each of the light sources 60 comprises a light housing 61 and a light generator 62 supported at a center of the light housing 61, wherein the light is projected out of the light housing 61 through the light generator 62 to form the discrete image 100. The light housings 61 are placed side-by-side to space apart the light generators 62. For example, the length of the light housing 61 is Y mm and the width of the light housing 61 is X mm, so that the molding space, i.e. the area of the light housing 61, is defined as $X*Y$ mm². In one embodiment, the light sources 60 are placed in a 4×2 array. A distance between two adjacent light generators 62 in row is X-2 mm and a distance between two adjacent light generators 62 in column is Y-2 mm. Therefore, the overlapped edge between two neighboring discrete images 100 will be 2 mm.

Figure 5:
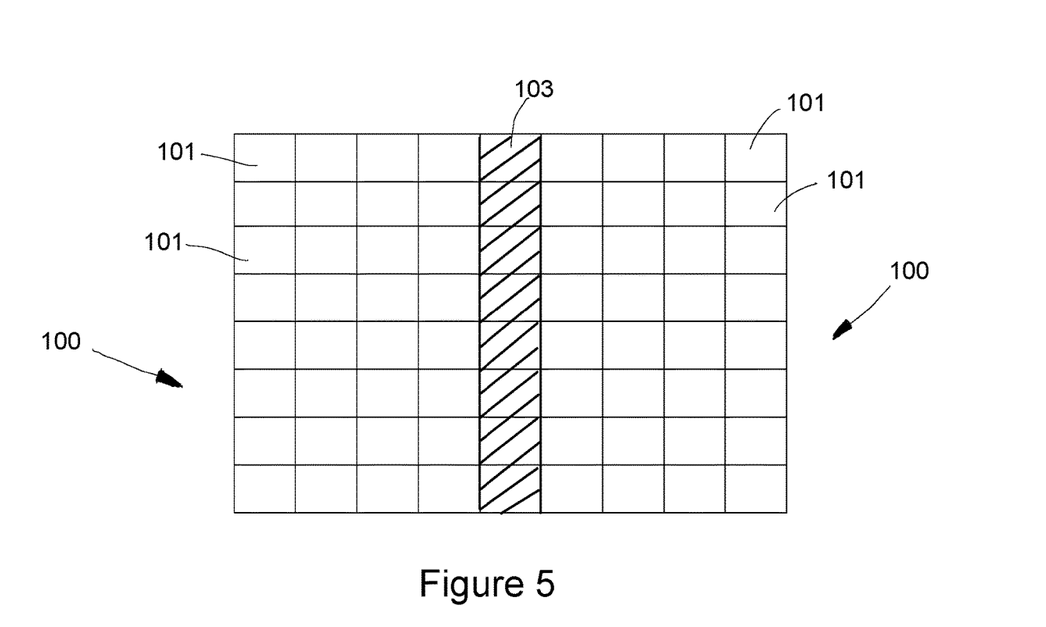
FIG. 5 shows one method to combine two neighboring discrete images into a combined image according to the present invention.

There are different ways to combine different discrete images 100 to form the combined image. In one example, the control processor 10 duplicates the voxels 101 at the edge portions of each of the discrete images 100 to form duplicated voxels 103 for combing the discrete images 100, so that the discrete images 100 are combined when the duplicated voxels 103 are overlapped with each other as shown in FIG. 5. In this example, the duplicated voxels 103 are pre-configured in each discrete image 100 being projected by the corresponding light source 60. Therefore, when the discrete images 100 are projected on the resin reservoir 51 to solidify the liquid resin, the duplicated voxels 103 along the edge portion of the discrete image 100 will overlap with the duplicated voxels 103 along the edge portion of the neighboring discrete image 100. As a result, the discrete images 100 are perfectly combined to form the combined image with the larger printing area. The duplicated voxels 103 are shown in FIG. 5 to indicate two side-by-side discrete images 100 combined to form the combined image.

Figure 6:
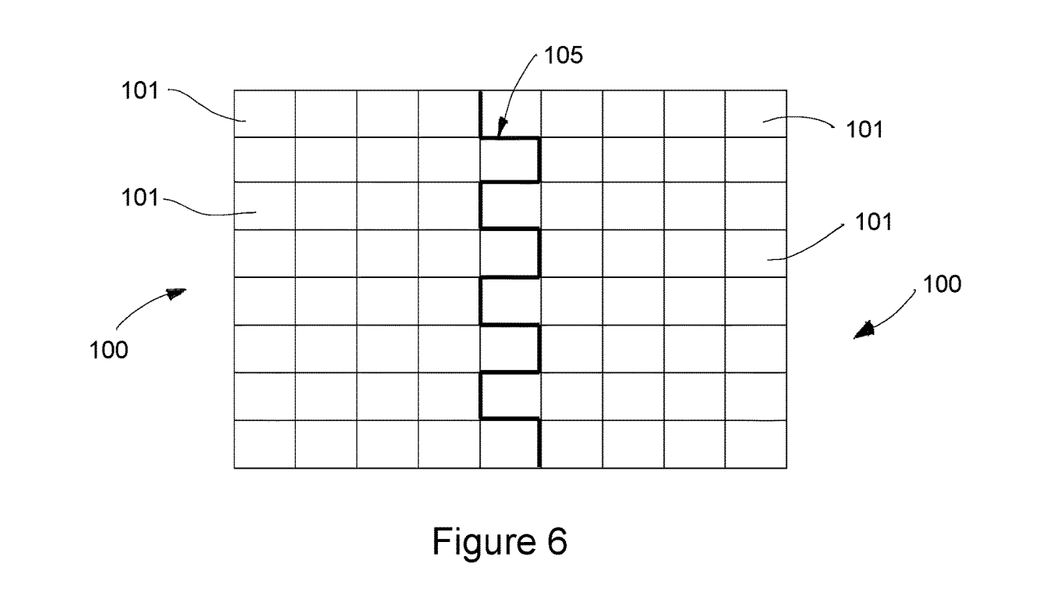
FIG. 6 shows an alternative method to combine two neighboring discrete images into a combined image according to the present invention.

In another example, an edge portion of each of the discrete images 100 has a zigzag configuration, so that two edge portions of two neighboring discrete images 100 are matched with each other in order to combine the discrete images 100 to form the combined image as shown in FIG. 6. Accordingly, the control processor 10 modifies the voxels 101 at the edge portions of each of the discrete images 100 in the zigzag configuration for combing the discrete images 100, so that the discrete images 100 are combined when the edge portions of the discrete images 100 are matched with each other. A zigzag connection line 105 is shown in FIG. 6 to indicate two side-by-side discrete images 100 combined to form the combined image.

Figure 7:
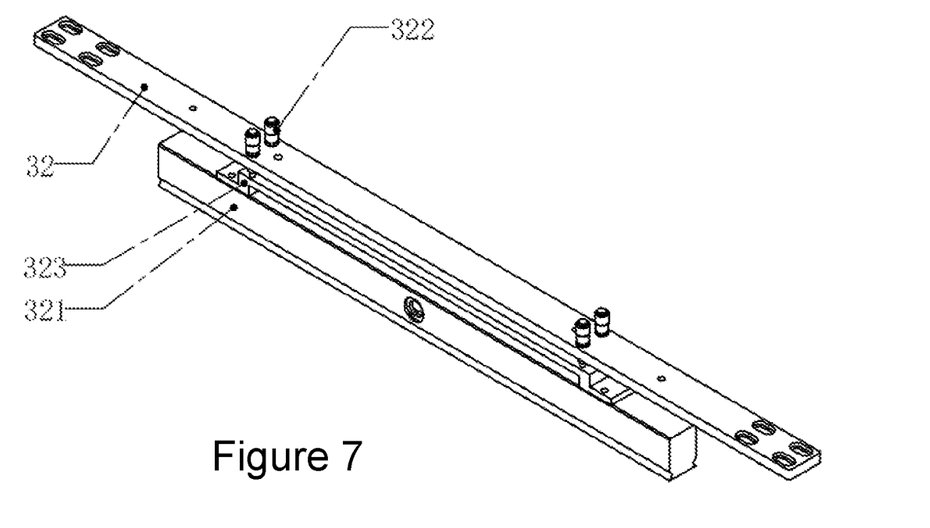
FIG. 7 is a perspective view the scraping arrangement of the 3D printer according to the present invention.

In FIGS. 1 and 7, the scraping arrangement comprises a motor 31, such as a stepped motor, a linear guide 32, a leveling block 331, an encoder 311, a scraper 321, a vacuum pump 34, a pressure adjustor 341, and a differential adjustor 323.

The motor 31 is supported within the frame 1 to drive the scraper 321 to move horizontally above the surface of the liquid resin. The linear guide 32 is perpendicular to two parallel guiding tracks which are horizontally supported by the frame 1. In FIG. 7, the scraper 321 is supported underneath the linear guiders 32, so that when scraper 321 is driven to move by the linear guide 32. The level of the linear guide 33 is adjusted by the leveling block 331 to ensure the horizontal level of the scraper 321 with respect to the surface of the liquid resin. The scraper 321 is adjustably coupled at the linear guide 32, wherein the horizontal level of the scraper 321 is further fine-adjusted via the differential adjustor 323 to ensure the horizontal movement of the scraper 321. The differential adjustor 323 is coupled between the linear guide 32 and the scraper 321 and is actuated via an adjustor head 322 extended above the linear guide 32.

Figure 8:
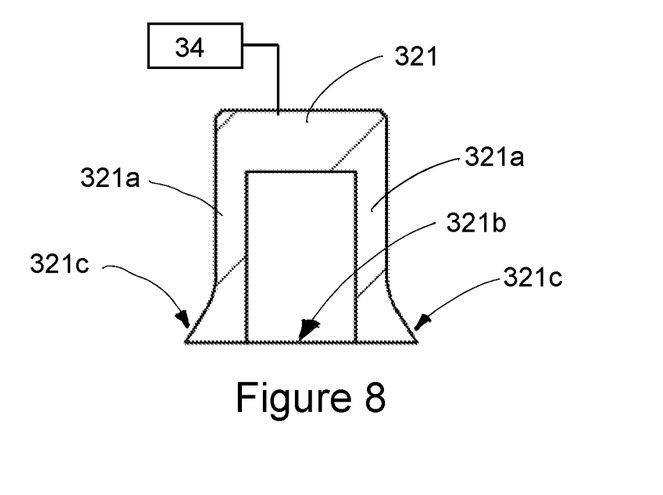
FIG. 8 is a sectional view of the scraper of the 3D printer according to the present invention.

In FIG. 8, the scraper 321 has a hollow configuration. More specifically, the scraper 321 has a U-shaped cross section and defines two scraping walls 321a and a bottom opening 321b therebetween. The vacuum pump 34 is connected to the scraper 321 via a gas tube, wherein the vacuum pump 34 is operated for sucking the liquid resin into the scraper 321 through the bottom opening 321 thereof. Therefore, when the scraper 321 is moved horizontally for scraping on the surface of the liquid resin, the liquid resin within the scraper 321 is released on the surface to ensure the flatten of the surface of the liquid resin. The pressure adjustor 341 is connected to the vacuum pump 34 to control the pressure level thereof to control the vacuum force in order to control how much liquid resin being sucked into the scraper 321. Therefore, the amount of the liquid resin is controlled to be sucked into the scraper 321 and is controlled to be released from the scraper 321 for ensuring the flattened surface of the liquid resin after the scraper 321 is moved to scrape thereon. The scraper 321 further has two sharper edges 321c formed at outer bottom edges of the scraping walls 321a respective for poking bubbles formed on the surface of the liquid resin, to prevent any bubble at the liquid resin from being solidified. The encoder 311 is connected to the motor 31, wherein the motor 31 is immediately deactivated when the encoder 311 detects any abnormal operation of the scraper 321, such as the scraper 321 stopped during the printing operation.

Figure 9:
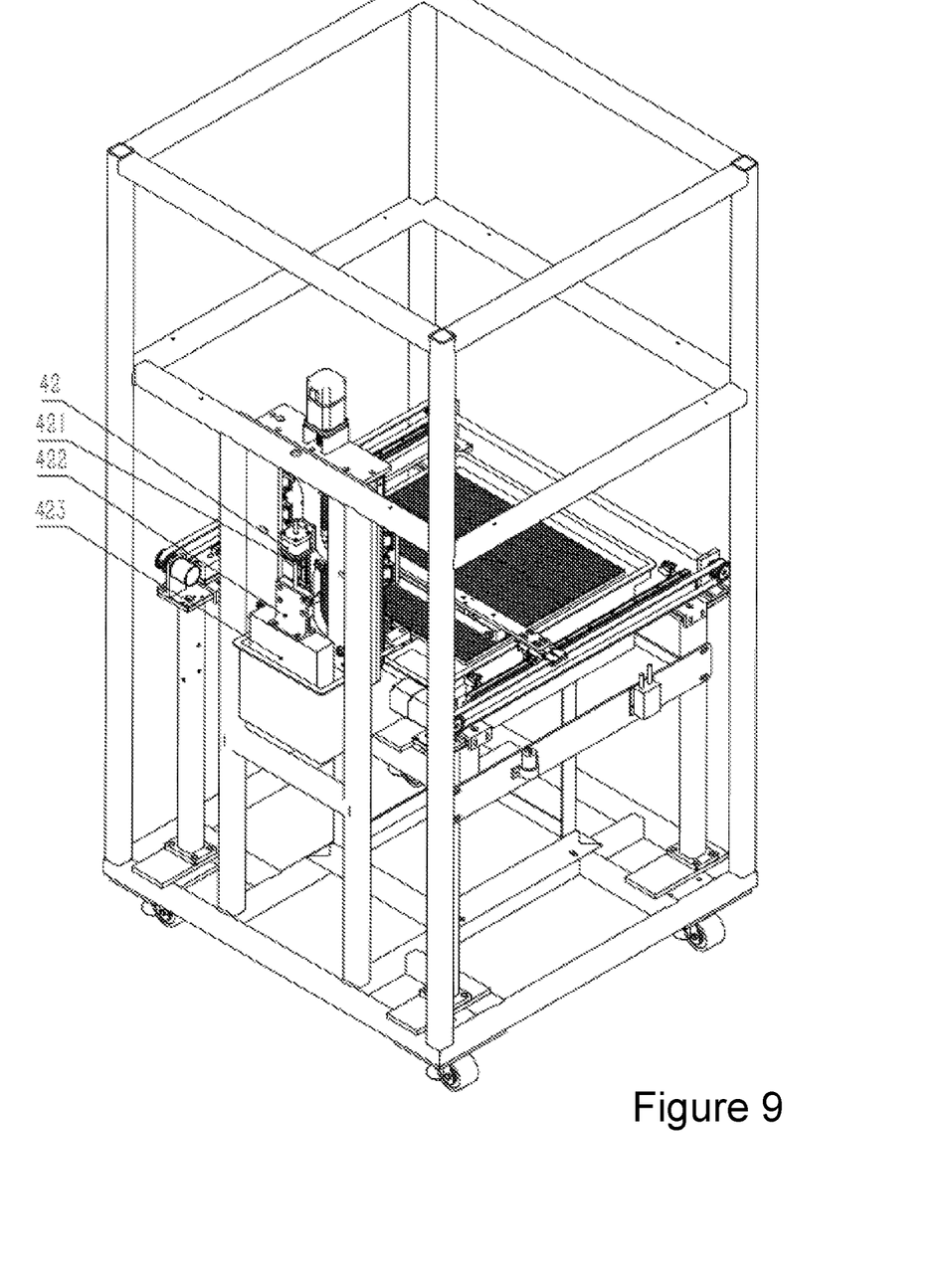
FIG. 9 is a perspective view of the liquid surface control arrangement of the 3D printer according to the present invention.

FIGS. 1 and 9 depict the liquid surface control arrangement which comprises a distance sensor 41, a second motor 42, such as a step motor, a linear rail 421 and a control block 423. The distance sensor 41 is supported above the resin reservoir 51 for detecting a distance between the light sources 60 and the surface of the liquid resin. During the printing operation, the distance sensor 41 will collect the distance data and will transmit the distance data to the control processor 10 to control the second motor 42. The linear rail 421 is supported vertically and is connected between the second motor 42 and the control block 423, wherein the second motor 42 is connected above the control block 423 to drive the control block 423 moving along the linear rail 421. In response to the distance data, the second motor 42 is operated to control the vertical movement of the control block 423 along the linear rail 421. By controlling the vertical displacement of the control block 423, the distance between the light sources 60 and the surface of the liquid resin can be adjusted and controlled to ensure the uniform thickness of the layer of the 3D object being built via the solidification of the surface of the liquid resin. The liquid surface control arrangement further comprises a limited stopper 422 coupled at the linear rail 421 below the second motor 42 to limit the upward displacement of the control block 423.

Figure 10:
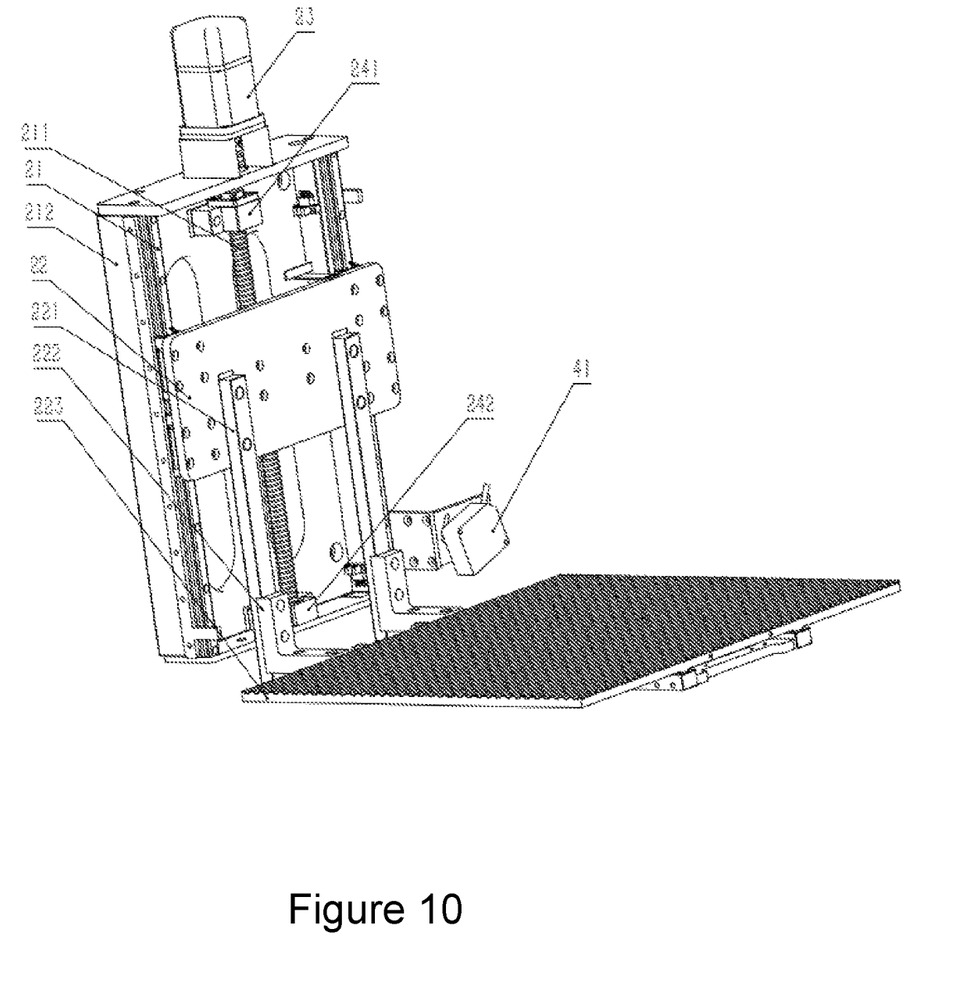
FIG. 10 is a perspective view of the printing arrangement of the 3D printer according to the present invention

FIGS. 1 and 10 depict the printing arrangement which further comprises a servo motor 23, a retention seat 241, a threaded driving rod 211, a vertical guide 21, a print arm assembly 221, and a printing platform 223. Accordingly, the servo motor 23 is connected to the driving rod 211 via a coupler, wherein the servo motor 23 is operated to drive the driving rod 211 to rotate. The print arm assembly 221 is movably connected to the driving rod 211, wherein the printing platform 223 is connected to the print arm assembly 221. When the driving rod 211 is rotated, the print arm assembly 221 is driven to move vertically to lift up or drop down the printing platform 223. For example, when the servo motor 23 is operated to generate a rotational power to drive the driving rod 211 rotating clockwise, the printing platform 223 is driven to lift upwardly via the print arm assembly 211. When the servo motor 23 is operated to generate a reversed rotational power to drive the driving rod 211 rotating counterclockwise, the printing platform 223 is driven to drop downwardly via the print arm assembly 211. The servo motor 23 is connected to the control processor 10 in order to control the operation of the servo motor 23.

The printing platform 223 submerged into the liquid resin within the resin reservoir 51 below the surface of the liquid resin, wherein the liquid resin above the printing platform 223 is solidified to build the layer of the 3D object. Accordingly, the printing platform 223 is stationary when building the layer of the 3D object thereon and is moved downwardly for submerging the layer of the 3D object below the surface of the liquid resin. The printing platform 223 has a plurality of resin passage meshes formed thereon to communicate the upper side of the printing platform 223 with the bottom side thereof, wherein when the printing platform 223 is moved up-and-down within the resin reservoir 51, the liquid resin can pass through the resin passage meshes to flow between the upper side and the bottom side of the printing platform 223. Therefore, the liquid resin can be quickly leveled to become the flatten surface of the liquid resin in order to save the printing time for each layer of the 3D object. A height-adjustable supporting frame 52 is located underneath the resin reservoir 51, wherein via the supporting frame 52, the height level of the resin reservoir 51 can be adjusted to incorporate with the printing platform 223.

The operation of the present invention comprises the following steps.

(1) Input data of the 3D into the control processor 10. The control processor 10 can be a computer as a 3D modeling computer, wherein a computer aided design program and/or software in installed to configure the 3D object with coordinates in X, Y and Z axis. The data of coordinates of the 3D object in X, Y, and Z axis are imported into the control processor 10. The data contains a plurality of layer data that the 3D object is being sliced to N layers, wherein the layer data can be converted by the control processor 10 to form the discrete image data for each light source 60.

(2) Control the operation of the light sources 60 via the control processor 10. The image data is transmitted to the light sources 60, wherein the light sources 60 are operated for flashing the discrete images 100 to the resin reservoir 51. Through the control processor 60, the discrete images 100 are combined to form the combined image projected on the surface of the liquid resin to form a first layer of the 3D object on the printing platform 223. It is appreciated that the light sources 60 are operated for flashing the discrete images 100 at the same time. Or, the light sources 60 are operated for flashing the discrete images 100 in an order manner. It is preferred that the light sources 60 are operated concurrently to flash the discrete images at the same time.

Before the discrete image 100 is formed, the control processor 10 will correct the distortion of each of the voxels 101. Therefore, the discrete image 100 is formed with the corrected voxels 101.

(3) Once the first layer of the 3D object is formed, the printing platform 223 is driven to drop downward within the resin reservoir 51 until the first layer of the 3D object is submerged under the surface of the liquid resin.

(4) The scraper 321 is actuated to scrap on the surface of the liquid resin to ensure the surface of the liquid resin in a flatten manner.

(5) Control the operation of the light sources 60 via the control processor 10 to flash another set of discrete images 100 in order to solidify the liquid resin above the first layer of the 3D object. As a result, a second layer of the 3D is formed to integrate with the first layer of the 3D object.

(6) Repeat the steps (2) to (5) until the last layer of the 3D object is formed to completely build the 3D object.

While the embodiments and alternatives of the invention have been shown and described, it will be apparent to one skilled in the art that various other changes and modifications can be made without departing from the spirit and scope of the invention.

What is claimed is:

1. A DLP 3D printer for building a 3D object, comprising:
   a printing module which comprises a resin reservoir arranged for being filled with a predetermined amount of liquid resin;
   a light exposure module which comprises a plurality of light sources supported above said resin reservoir, wherein each of said light sources is controlled to flash a discrete image to solidify the liquid resin;
   a control processor programmed to control said light sources to flash said discrete images at the same time and to combine said discrete images into a combined image for forming a layer of the 3D object when the liquid resin is solidified; and
   a scraping arrangement which comprises a scraper controlled by said control processor, wherein said control processor is programmed to actuate said scraping arrangement for flattening a surface of the liquid resin above the layer of the 3D object, wherein said light sources are supported side-by-side with a predetermined interval and configured to cause edge portions of two neighboring of said discrete images are overlapped with each other in order to combine said discrete images to form said combined image, wherein said control processor is programmed to activate said light sources to generate said discrete images in which each of said discrete images is composed of a plurality of voxels, wherein said control processor is programmed to duplicate said voxels at said edge portions of each of said discrete images to form duplicated voxels for combing said discrete images, so that said discrete images are combined when said duplicated voxels are overlapped with each other.

2. The DLP 3D printer of claim 1, wherein said control processor is programmed to further correct distortion of each of said voxels to ensure each of said voxels formed in a rectangular shape.

3. The DLP 3D printer of claim 2, wherein said control processor is programmed to further modify each of said discrete images that defines a discrete resin solidifying area and said combined image that defines a combined resin solidifying area which is larger than each of said discrete resin solidifying area, wherein said combined resin solidifying area is not smaller than an area of the layer of the 3D object.

4. The DLP 3D printer of claim 3, wherein said light sources are supported above said resin reservoir in an immovable manner.

5. The DLP 3D printer of claim 4, wherein said scraper has a U-shaped cross section and defines two scraping walls and a bottom opening therebetween, wherein said scraping arrangement further comprises a vacuum pump connected to said scraper for sucking the liquid resin into said scraper through said bottom opening thereof, so that when said scraper is moved horizontally for scraping on the surface of the liquid resin, the liquid resin within said scraper is released on the surface to ensure the flatten of the surface of the liquid resin.

* * * * *